3,214,236
METHOD OF CATALYTICALLY OXIDIZING HYDROCARBON AND CARBON MONOXIDE TO CARBON DIOXIDE
Paul B. Weisz, Media, Pa., assignor to Socony Mobil Oil Company, Inc., a corporation of New York
No Drawing. Filed Nov. 13, 1961, Ser. No. 152,019
8 Claims. (Cl. 23—2)

This invention relates to an improved method for catalytically conducting chemical reactions in the presence of a unique naturally occurring marine mineral. More particularly, the present invention is directed to a process for effecting catalytic conversion in the presence of a deposit found on the ocean floors known as manganese nodules.

Such material has, in accordance with the present invention, been found to be highly effective in catalyzing conversion reactions where the reactant charge is brought, in a fluid state, into contact under conversion conditions with the manganese nodules. The conversion processes in which such nodules are contemplated as being catalytically useful are those which involve steps of chemical oxidation or reduction. These include, by way of example, dehydrogenation, hydrogenation, desulfurization, denitrogenation, oxidation, aromatization and reforming. It will, of course, be understood that the manganese nodules are not catalytically effective with necessarily equivalent or comparable results as regards the foregoing processes. While not limited thereto, the invention will hereinafter be more fully described with reference to catalytic oxidation as exemplary of the aforenoted conversion processes.

Thus, in one embodiment, the present invention provides a method for catalytically oxidizing an oxidizable charge material in the presence of a catalyst consisting of manganese nodules. In another embodiment, the invention is concerned with effecting catalytic oxidation of oxidizable gases. In still another embodiment, the invention relates to a method wherein a carbon compound undergoes oxidation in the presence of a catalyst consisting essentially of manganese nodules. The process of the invention has particular application to catalytic treatment of exhaust gases from internal combustion engines for eliminating poisonous and noxious constituents thereof.

The manganese nodules described herein are thus useful in accomplishing oxidation of oxidizable gases and vapors, for example carbon monoxide, ammonia, sulfur dioxide, paraffins, olefins, aldehydes, alcohols, toluene, etc. by passing them together with a gas containing free oxygen, such as air, through the catalyst under controlled conditions of temperature.

In carrying out previous oxidizing reactions, it has generally been necessary to conduct the catalysis at elevated temperatures and in many instances the temperature necessary to cause the oxidation to take place has been in the neighborhood of red heat, i.e. about 1100° F. Such high temperature was required because of the comparatively low activity of the catalytic material employed and due to such necessity for high temperatures to increase the rate of oxidation, many such reactions could not be efficiently and economically carried out.

With the use of the manganese nodules as oxidation catalysts, desired oxidation can be effected at substantially lower temperatures or to a greater extent at a given temperature, as will be evident from data hereinafter set forth, than that capable of achievement with previous oxidation catalysts.

As indicated above, the method of the invention is particularly adaptable to treatment of exhaust gases from internal combustion engines. Exhaust gases emitted by vehicles utilizing internal combustion engines of either the spark ignition or auto ignition type may contain considerable quantities of toxic and obnoxious fumes. Such fumes comprise unburned or partially burned hydrocarbons, particularly olefinic hydrocarbons, which react with nitrogen oxides and with oxygen under the influence of sunlight to produce pollutants which have a distinctive odor, are irritating to the mucous membranes, particularly to the eyes and cause damage to certain species of plants. Of the toxic gases, carbon monoxide is one of the most deadly. Thus, amounts as small as 0.1 volume percent of carbon monoxide in the atmosphere is dangerous to life and lethal amounts can, without realization, be inhaled and combined with blood hemoglobin before its effects are realized. In areas of congested vehicular traffic where frequent stopping is necessary, the carbon monoxide contained in the exhaust gas of an average automobile ordinarily amounts to 3.0 to 6.0 percent by volume and may, at times, reach 9 percent by volume. Automobile and similar exhaust gases are also objectionable because of their malodorous constituents attributable to unburned fuel and oil and the decomposition products thereof.

It has heretofore been proposed to treat the above obnoxious and dangerous exhaust fumes by passage through a catalytic converter wherein the fumes are mixed with air and brought into contact with an oxidation catalyst and thereby undergo conversion. In such manner carbon monoxide is converted to carbon dioxide and hydrocarbon constituents of the exhaust gas undergo oxidation to carbon dioxide and water.

The temperature of exhaust gas streams at the end of the engine exhaust manifold in commercial cars generally range from about 55° F. when the engine is idle up to about 900° F. at 50 miles per hour. Higher temperatures result from greater speeds.

In view of the exposure of the oxidation catalyst to high temperatures after combustion takes place, it is essential that the catalysts employed be characterized by high heat stability. In addition, such catalysts to be acceptable must be capable of completely and continuously eliminating the total content of carbon monoxide and unburned hydrocarbon constituents of internal combustion engine exhaust gases by oxidation. Also, they must be capable of functioning at complete activity after being repeatedly heated to and cooled from operating temperatures as a result of the intermittent operation of the engine. The oxidation catalysts employed should further not be poisoned by lead deposits but should be capable of tolerating normal lead deposit fouling without a rapid loss in catalyst activity.

Various oxidation components deposited on a wide variety of supports have been suggested for effecting the desired oxidation of carbon monoxide and hydrocarbons contained in exhaust gases. Such composites while generally possessing one or more of the aforementioned attributes have been lacking in others and, to date, none of the suggested catalytic composites has received commercial acceptance.

The present invention affords an effective means for removing carbon monoxide and hydrocarbons from exhaust gases discharged by internal combustion engines by bringing said gases at the temperature of discharge into intimate contact with a catalyst comprising manganese nodules. The latter being a marine sediment is available without intermediate manufacturing processes between the point of obtaining the natural resource and its use as a catalyst. The abundant supply of manganese marine nodules provides an inexpensive source of effective oxidation catalyst and renders its use economical even if replaced at frequent intervals. Thus, the usual limitations on practicability restricting frequent replacement of previously suggested exhaust gas oxidation catalysts containing expensive components such as platinum, are not applicable with respect to the manganese nodules utilized in the present process. The catalyst of manganese nodules thus affords a system of exhaust gas purification which makes use of replaceable cartridges of this material, through which exhaust vapors are led and which cartridges are removable and replaceable as a part of servicing analogues to servicing an automobile engine, ignition battery, tires, and the like at periodic intervals.

The manganese nodules utilized as catalyst in the present method contain not only manganese, but several other important metals including iron, cobalt, nickel and copper. The manganese nodules, as above indicated, are found on the floor of oceans and are particularly abundant in the Pacific Ocean. The nodules are characterized by a large surface area, i.e. in excess of 200 m.$^2$/gram. The manganese nodules have a wide variety of shapes but most often they look like potatoes. Their color varies from earthy black to brown depending upon their relative manganese and iron content. The nodules are porous and light, having an average specific gravity of about 2.4. Generally they range from 1 to 9 inches in diameter but may extend up to considerably larger sizes approximating 4 ft. in length and 3 ft. in diameter and weighing as much as 1700 lbs. The nodules utilized as catalysts in the method described herein may be of any suitable particle size useful in the particular conversion operation. Thus, the particle size of the manganese nodules may vary from fairly large pieces down to and including powdered material useful in a fluidized catalytic operation.

Although nodules from individual deposits assay as high as 80 percent manganese dioxide, the average composition of 30 samples of nodules from all the oceans was found to be by weight 32 percent manganese dioxide, 22 percent iron oxides, 19 percent silicon dioxide and 14 percent water, with smaller quantities of aluminum oxides, calcium and magnesium carbonates and various metals including nickel, copper, cobalt, zinc and molybdenum. Some of the minerals in nodules have no names, because their exact crystalline structures have never been encountered before.

From an economics standpoint, manganese, nickel, cobalt and copper are the interesting metals in the nodules. The maximum amounts of these metals found thus far in nodules are 50 percent manganese, 2 percent cobalt, 1.6 percent nickel and 1.9 percent copper. Nodules from 45 locations in the eastern Pacific have been analyzed for these four metals. Although this is a small sample of such a vast area, it is significant because sea-floor sediments tend to be rather uniform over large regions.

Manganese nodules are also found in the Atlantic Ocean, but they seem to be of a much lower grade than those in the Pacific. Typical samples of Atlantic nodules assay 18 percent manganese, 18 percent iron, .4 percent cobalt, .6 percent nickel and .4 percent copper.

The maximum, minimum and average assay of 30 samples of manganese nodules from all of the world's oceans are shown below:

| Material | Weight Percentages | | |
|---|---|---|---|
| | Maximum | Minimum | Average |
| $MnO_2$ | 90.0 | 11.4 | 31.7 |
| $Fe_2O_3$ | 44.1 | 0.8 | 21.7 |
| $SiO_2$ | 42.3 | 2.8 | 19.4 |
| Water | 29.7 | 8.7 | 13.7 |
| $Al_2O_3$ | 12.8 | 0.3 | 4.6 |
| $CaCO_3$ | 10.2 | 0.9 | 3.5 |
| $CaSO_4$ | 1.3 | 0.3 | 0.7 |
| $Ca_3(PO_4)_2$ | 7.2 | 0.0 | 0.5 |
| $MgCO_3$ | 4.9 | 0.1 | 2.3 |
| NiO, CoO, CuO, MoO, ZnO, PbO, $V_2O_3$, Rare Earths | 6.1 | 0.1 | 2.0 |

The oxidizable material being brought into contact with the catalyst of manganese nodules may vary widely and include both inorganic and organic fluids, i.e. both gases and liquids. Thus, the catalyst of manganese nodules is useful in oxidation of gaseous ammonia and in the oxidation of sulfur dioxide to sulfur trioxide, which in turn is employed in the manufacture of sulfuric acid. Likewise, the carbon compounds undergoing oxidation in accordance with the present process may vary widely and include carbon monoxide, sulfur-containing carbon compounds, nitrogen-containing carbon compounds, oxygen-containing compounds, hydrocarbons or mixtures thereof. The hydrocarbon may be a paraffinic, olefinic, naphthenic, aromatic component or a mixture of two or more of such components. Representative carbon compounds susceptible to catalytic oxidation under the conditions described herein include: carbon monoxide, methane, propylene, butane, isobutylene, butene-1, n-heptane, methyl cyclohexane, hexene-1, 2-methyl-butene-2, 3-methyl pentane, methyl cyclopentane, toluene, decalin, naphthalene; as well as thiophenes, pyridines, mercaptans, alcohols, ethers, aldehydes and other organic compounds.

It has been found, in accordance with the present invention, that oxidizable materials can be effectively oxidized in a direct manner by bringing the same in the pressure of an atmosphere containing free oxygen, such as air, into contact with the manganese nodule catalyst and removal therefrom of the oxidation product and subsequently separating the product formed upon catalytic oxidation of the oxidizable material from the catalyst. The oxidizable charge material may be contacted with the catalyst comprising manganese nodules at temperatures within the approximate range of 250 to 1500° F. and more usually at a temperature between about 400 and about 900° F. The process may be carried out on a batch basis or may be conducted continuously by passing the oxidizable charge material and oxygen-containing gas simultaneously over the catalyst to conditions such that the mole ratio of oxygen to charge is within the approximate range of .1:1 to 200:1.

The manganese nodule catalyst utilized in the present process has the further advantage of being a source of manganese and other valuable metals after being spent in effecting the desired catalytic conversion. Thus, for example, the manganese nodules may be used as a catalyst in effecting oxidation of automobile exhaust gas until the catalyst becomes deactivated for such purpose, after which the manganese nodules are removed and processed by suitable chemical means to obtain manganese and other valuable metal components such as copper, nickel and cobalt therefrom.

In the illustrative and comparative examples hereinafter set forth the following catalytic materials were utilized.

Manganese Marine Nodules:

| Sample | Geographic Origin (Pacific Ocean) | | | Metal Analysis | | | | |
|---|---|---|---|---|---|---|---|---|
| | Latitude | Longitude | Approximate Location | Mn | Fe | Co | Ni | Cu |
| A | 22-18N | 107-48W | S. California. | 27.5 | 2.6 | .06 | .11 | .04 |
| B | 16-29S | 145-33W | Tahiti | 30.9 | 19.0 | 1.5 | .73 | .19 |
| C | 23-17N | 141-13W | Hawaii | 19.3 | 15.3 | .54 | .54 | .42 |

Commercial Oxidation Catalysts:

| Sample | Composition |
|---|---|
| X | 0.1% Platinum Deposited on Alumina. |
| Y | 10% Copper Oxide Deposited on Clay. |

The following examples will serve to illustrate the method of the invention without limiting the same:

*Example 1*

A charge of 2% butene-1 in air flowing at a rate of 50 cc./min. was passed at various specified temperatures over a 0.2 gram sample of catalyst consisting of manganese marine nodules, affording a residence time of 0.2 second. The weight percent conversion to oxidized products, i.e. carbon dioxide and water, at various temperatures of operation with two different samples of the catalyst are shown below:

|  | Conversion, Wt. Percent | | | |
|---|---|---|---|---|
| Temp., °F | 600 | 700 | 800 | 900 |
| Catalyst sample: | | | | |
| A | 14 | 27 | 41 | 45 |
| B | 9 | 13 | 37 | 92 |

It will be seen from the foregoing results that at a temperature of 700° F., the manganese nodule catalyst of sample A afforded appreciable oxidation, the extent of which increased substantially at a temperature of 800° F. and thereafter only slightly at 900° F. The manganese nodule catalyst of sample B, on the other hand, afforded only moderate conversion at 700° F. which increased substantially at 800° F. and thereafter very markedly increased at 900° F. to provide a 92 weight percent conversion.

*Example 2*

A charge of 10% carbon monoxide in air flowing at a rate of 60 cc./min. was passed at various specified temperatures over a 0.1 gram catalyst sample affording a residence time of about .1 second. The catalysts employed included manganese marine nodule samples A and C and commercial catalyst X. The catalyst samples A and C were heated initially in air at 550° C. for 1 hour, then evacuated and heated for an additional hour at 550° C. to simulate aging. There was thus eliminated the possibility that any observed catalytic activity might be attributable to a transitory initial state of the sample. The volume percent of $CO_2$ produced as a result of catalytic combustion of the CO charge for various temperatures of operation with the indicated catalysts are shown below:

|  | Vol. Percent of $CO_2$ Produced | | |
|---|---|---|---|
| Temp., °F | 300 | 400 | 500 |
| Catalyst Sample: | | | |
| A | 2.0 | 11.3 | 13.4 |
| C | 2.0 | 10.3 | 10.3 |
| X | | 1.0 | 13.2 |

It will be evident that the percent volume of $CO_2$ observed at 500° F. is about equal to the total possible amount of $CO_2$ obtainable from the reaction mixture, i.e. it corresponds to approximately 100 percent conversion. The data at the lower temperatures are then most significant. They show that not only are the manganese nodule samples active catalysts, but that their catalytic oxidation activity greatly exceeds that of a commercial platinum-containing catalyst.

*Example 3*

A charge of 3% methane in air flowing at a rate of 60 cc./min. was passed at specified temperatures over a 0.1 gram catalyst sample, affording a residence time of about .1 second. The catalysts employed were the same as those used in Example 2. The maximum volume of $CO_2$ which corresponds to 100 percent conversion of the methane would, in this case, be equal to 3%. The volume percent of $CO_2$ produced as a result of catalytic combustion of the methane charge for various temperatures of operation are shown below:

|  | Vol. Percent of $CO_2$ Produced | | |
|---|---|---|---|
| Temp., °F | 700 | 800 | 900 |
| Catalyst Sample: | | | |
| A | | .4 | 3.0 |
| C | nil | 1.0 | 3.0 |
| X | | nil | 2.0 |

The foregoing data show that the manganese nodule catalysts are more active than the commercial platinum-containing catalyst utilized as a standard in that conversion was achieved with the nodule catalysts at a lower temperature and that 100 percent conversion was obtained at a temperature of 900° F. with such catalysts while a substantially lesser conversion was realized at said temperature with the commercial platinum-containing catalyst.

*Example 4*

A charge of 6.7% butane in air flowing at a rate of 15 cc./min. was passed at hereinafter specified temperatures over a 3 cc. catalyst sample, affording a residence time of 12 seconds. The catalysts employed are shown in the table below. The maximum weight percent of butane undergoing conversion which corresponds to 100 percent combustion, in this case, is about 40%, since such amount is limited by the quantity of oxygen in the mixture. The weight percent of butane burnt as a result of catalytic oxidation for various temperatures with the indicated catalysts are shown below:

|  | Percent of Butane Combusted | | | | |
|---|---|---|---|---|---|
| Temp., °F | 400 | 500 | 600 | 700 | 800 |
| Catalyst Sample: | | | | | |
| A | 8 | 32 | 40 | 40 | 40 |
| B | 26 | 34 | 40 | 40 | 40 |
| C | 34 | 40 | 40 | 40 | 40 |
| Y | nil | 1 | 4 | 21 | 31 |
| $MnO_2$ | 1.2 | 10.8 | 24.2 | 35.5 | 38.8 |

It will be seen from the above data that the marine manganese nodule catalysts possessed a much higher catalytic oxidation activity than the commercial copper oxide oxidation catalyst. Also, it will be evident that the nodule catalysts when compared with pure manganese oxide unexpectedly showed an appreciably greater oxidation activity.

*Example 5*

A charge of 2% n-butane in air flowing at a rate of 50 cc./min. was passed at hereinafter specified temperatures over a 0.33 cc. catalyst sample, affording a residence time of 0.4 second. At these conditions, 100 percent of theoretical conversion corresponds to approximately 100 percent of the butane converted. The weight percent of butane burnt as a result of catalytic oxidation for various temperatures are shown below:

|  | Percent of Butane Combusted | | | |
|---|---|---|---|---|
| Temp., °F | 600 | 700 | 800 | 900 |
| Catalyst Sample: | | | | |
| B | 10 | 50 | 60 | 80 |

As will be evident from the foregoing data, the manganese marine nodule exhibited extremely high catalytic oxidation activity.

It is to be understood that the above description is merely illustrative of preferred embodiments of the invention of which many variations may be made within

I claim:

1. A process for removing carbon monoxide and hydrocarbons from exhaust gases discharged by internal combustion engines which comprises mixing the same with a sufficient quantity of a combustion supporting medium to effect oxidation of said carbon monoxide and hydrocarbons to carbon dioxide and thereafter contacting the resulting mixture, at a temperature adequate to effect said oxidation, with a catalyst comprising the naturally occurring marine deposit known as manganese nodules.

2. A process for removing carbon monoxide and hydrocarbons from exhaust gases emitted by internal combustion engines by oxidation thereof to carbon dioxide at the temperature of discharge which comprises contacting said hot gases in the presence of air with a catalyst consisting essentially of the naturally occurring marine deposit known as manganese nodules.

3. A process for catalytically oxidizing at least one compound selected from the group consisting of carbon monoxide and hydrocarbons to yield carbon dioxide which comprises contacting the same at a temperature within the approximate range of 250 to 1500° F. with an atmosphere containing free oxygen, the molar ratio of oxygen to said compound being between about 0.1:1 and 200:1 in the presence of a solid porous catalyst consisting essentially of the naturally occurring marine deposit known as manganese nodules.

4. A process for catalytically oxidizing at least one compound selected from the group consisting of carbon monoxide and hydrocarbons which comprises contacting the same with a sufficient quantity of a combustion supporting medium to effect oxidation of said compound to carbon dioxide in the presence of a catalyst comprising the naturally occurring marine deposit known as manganese nodules.

5. The process of claim 3 wherein the compound is carbon monoxide.

6. The process of claim 3 wherein the compound is a hydrocarbon.

7. The process of claim 4 wherein the compound is carbon monoxide.

8. The process of claim 4 wherein the compound is a hydrocarbon.

References Cited by the Examiner
UNITED STATES PATENTS
1,345,323    6/20    Frazier et al. _____ 23—2.2

MAURICE A. BRINDISI, *Primary Examiner.*

UNITED STATES PATENT OFFICE
CERTIFICATE OF CORRECTION

Patent No. 3,214,236　　　　　　　　　　　　October 26, 1965

Paul B. Weisz

It is hereby certified that error appears in the above numbered patent requiring correction and that the said Letters Patent should read as corrected below.

Column 2, line 31, for "55 F." read -- 550° F. --; column 4, line 8, before "compounds" insert -- carbon --.

Signed and sealed this 21st day of June 1966.

(SEAL)
Attest:

ERNEST W. SWIDER　　　　　　　　　　　　EDWARD J. BRENNER
Attesting Officer　　　　　　　　　　　　Commissioner of Patents